United States Patent [19]

Pawloski et al.

[11] Patent Number: 4,809,167

[45] Date of Patent: Feb. 28, 1989

[54] CIRCUITRY FOR EMULATING SINGLE CHIP MICROCOMPUTER WITHOUT ACCESS TO INTERNAL BUSES

[75] Inventors: Martin B. Pawloski, Gilbert; Shekhar Y. Borkar, Mesa, both of Ariz.

[73] Assignee: Metalink Corporation, Chandler, Ariz.

[21] Appl. No.: 157,104

[22] Filed: Feb. 10, 1988

Related U.S. Application Data

[63] Continuation of Ser. No. 751,806, Jul. 3, 1985, abandoned.

[51] Int. Cl.[4] .............................................. G06F 9/44
[52] U.S. Cl. .................................................. 364/200
[58] Field of Search ........................ 364/200, 300, 900

[56] References Cited

U.S. PATENT DOCUMENTS

| 4,441,154 | 4/1984 | McDonough et al. | 364/200 |
| 4,527,234 | 7/1985 | Bellay | 364/200 |
| 4,677,586 | 6/1987 | Magar et al. | 364/900 |

Primary Examiner—Raulfe B. Zache
Attorney, Agent, or Firm—Cahill, Sutton & Thomas

[57] ABSTRACT

An emulator circuit utilizes an Intel 8031 microprocessor with external address and data buses to emulate an Intel 8051 single chip microcomputer with no external buses by providing external registers into which the contents of the internal 8031 "Port 0" and "Port 2" registers are output and functionally "recreated". The external access (EA) lead is toggled to make the 8031 function as an 8051 during the states in which the 8051 samples its logic levels and destroys port 0 latches if configured as an 8031. Toggling the EA lead to a high level causes outputting the contents of the Port 0 and Port 2 latches to their respective leads. The emulator circuit generates a "Force Ports" pulse that causes the "recreated" port registers or the external circuitry to "force" external logic levels onto the 8031 Port 0 and Port 2 leads. The address latch enable (ALE) signal is delayed until after the Force Ports signal lapses to allow the internal Port 0 logic to generate address outputs on its leads as part of the external address bus.

20 Claims, 3 Drawing Sheets

CIRCUITRY FOR EMULATING SINGLE CHIP MICROCOMPUTER WITHOUT ACCESS TO INTERNAL BUSES

CROSS REFERENCE TO RELATED APPLICATION

This application is a continuation of co-pending application Ser. No. 751,806, filed July 3, 1985, by Martin B. Pawloski and Shekhar Y. Borkar, entitled "CIRCUITRY FOR EMULATING SINGLE CHIP MICROCOMPUTER WITHOUT ACCESS TO INTERNAL BUSES", now abandoned.

BACKGROUND OF THE INVENTION

The invention relates to circuits for emulating single chip microcomputers that have no external address and data buses, and more particularly to emulator circuits for emulating the operation of the Intel 8051 family of single chip microcomputers without utilizing a custom 8051 family "bond out chips" that are proprietary to Intel and are not sold commercially.

Those skilled in the art are aware of the fact that most presently commercially available integrated circuit "microprocessors" can be broadly classified into two categories, including single chip microcomputers and general purpose microprocessors. Single chip microcomputers incorporate on a single silicon chip a CPU (Central Processing Unit), a random access memory, a read only memory, various control or input/output functions, and, various input/output ports. General purpose microprocessors, on the other hand, usually include only the CPU. Their internal address buses and internal data buses are coupled by suitable buffers and/or multiplexers to external data and address buses. Most single chip microcomputers can be operated either as a single chip microcomputer, i.e., in a "single chip mode" or as a general purpose microprocessor, i.e., in a "microprocessor mode". If a single chip integrated circuit microcomputer is to be operated in its "microprocessor mode", it "reconfigures" some of its input/output (I/O) ports as an address/data bus. In this mode, such I/O ports lose their functionality as I/O ports. In contrast, if the single chip microcomputer is operated in its "single chip mode", random access memory (RAM) and read only memory (ROM) on the chip, rather than external RAM and ROM, are utilized, so that all the I/O ports are available for their intended use.

Whether a single chip microcomputer operates in its microprocessor mode or its single chip mode is usually determined by a "strapping option" for one "external access" (EA) lead of the integrated circuit. For example, if that lead is connected to the positive power supply, the integrated circuit operates in its single chip mode, but if the (EA) lead is connected to the ground conductor, then the integrated circuit operates in its microprocessor mode.

Presently, the Intel 8051 single chip microcomputer is probably the one most commonly used. It has four I/O ports, named Port 0, Port 1, Port 2, and Port 3, each of which are eight-bit digital I/O ports that can be used for general purpose input/output functions. The EA (External Access) lead of the Intel 8051 (hereinafter, simply the 8051) is connected to the positive power supply $+V_{CC}$. If the EA lead is connected to ground, the very same chip, i.e., integrated circuit, is referred to as the 8031 microprocessor, or simply as the 8031. (Hereinafter, the term "chip" and "integrated circuit" are interchangeable). In the 8031, Port 0 and Port 2 are configured as a multiplexed address/data bus. The 8031 has the characteristic that any logic levels stored in the internal Port 0 register are destroyed each memory cycle. The Port 2 register is not destroyed. However, Port 2 leads emit the high addresses, so the latched data does not appear on the Port 2 leads. This fact, in addition to the fact that the internal data bus and address bus of the 8051 are inaccessible from outside of the chip, makes it very difficult for companies other than Intel (which manufactures a proprietary bond out chip for its own use only) to make economical emulators that are capable of emulating the 8051. Yet, the popularity of the 8051 indicates that there should be a very attractive market for in-circuit 8051 emulators.

Those skilled in the art realize that microcomputer application design engineers find it very convenient to have real-time in-circuit emulators that provide direct control over the execution of programs being developed for the single chip microcomputers or single chip general purpose microprocessors. Such emulators enable the design engineers to determine whether their programs are operating as expected, and make it relatively easy to debug such programs. Unfortunately, up to now it has been essential, as a practical matter, to have external access to the internal address and data bus for a microprocessor or single chip microcomputer in order to design an in-circuit emulator therefor. For single chip microcomputers wherein external access to the internal address and data bus is not provided, microprocessor manufacturers usually have fabricated, for their own internal use only, various "bond out chips", which are "semi-custom" versions of their commercially marketed single chip microcomputers, that "bond out" the internal data and address buses to leads of a suitable IC (integrated circuit) package. Generally, such "bond-out chips" are not available for purchase by the public. This enables the single chip microcomputer manufacturer to essentially "lock up" the market for systems which can economically emulate for the single chip microcomputers.

At the present state of the art, most engineers in the IC microprocessor/microcomputer emulator industry believe that it is, as a practical matter, impossible to build an economical real time in-circuit emulator for the 8051 single chip microcomputer without a bond-out chip. To my knowledge, all 8051 emulators commercially available to date use bond-out chips.

Thus, the commercial market for 8051 in-circuit emulators is not very competitive, and there remains an unmet need for relatively low-cost real time in-circuit emulators for the 8051 single chip microcomputer.

SUMMARY OF THE INVENTION

Accordingly, it is an object of the invention to provide a low cost emulator for a single chip microcomputer without using a bond-out chip, wherein the single chip microcomputer provides no direct access to its internal address/data bus or buses.

It is another object of the invention to provide a real-time in-circuit emulator for an 8051 single chip microcomputer, using an 8031 general purpose microprocessor chip, or any of the 8051 family of single chip microcomputers, using corresponding general purpose microprocessor chips.

It is another object of the invention to provide a real-time in-circuit emulator capable of emulating the 8051/8031 in either its single chip mode or the microprocessor mode.

It is another object of the invention to provide a real time in-circuit emulator for the 8051 single chip microcomputer and family of microcomputers which can emulate the read modify write instructions on all the I/O ports thereof.

Briefly described, and in accordance with one embodiment thereof, the invention provides a circuit for emulating a single chip microcomputer having no direct external access to the internal data/address bus or buses, by operating a general purpose microprocessor chip having a CPU and internal bus structure essentially similar to that of the single chip microcomputer to "recreate" in external port registers the data of the internal port registers, and operating the general purpose microprocessor chip in a "single chip mode" only during a predetermined portion of the internal machine cycle. In the described embodiment of the invention, the EA lead of the 8031 included in the real-time in-circuit emulator is controlled so that for part of the external memory cycle the 8031 is internally configured like the 8051 single chip microcomputer being emulated. As such, it retains the integrity of its Port 0 and Port 2 registers by providing the logic levels therein as outputs on the Port 0 and Port 2 leads. For the other part of the external memory cycle, the 8031 operates in its general purpose microprocessor mode, outputting addresses and reading and writing data. More specifically, the EA lead is raised to a high level during Phase 2 of every ALE pulse, thereby preventing the Port 0 register contents from being destroyed, by causing the 8031 to be configured as an 8051, which does not destroy its Port 0 register contents, as the 8031 does. The internal Port 0 and Port 2 register contents are output to the I/O Port 0 and Port 2 leads and the resulting levels are latched into external recreated port registers during State 1, Phase 2 of the internal machine cycle immediately after the internal port registers have been updated. During State 5, the external inputs to Port 0 are forced back into the 8031, even though the internal latches of Port 0 of the 8031 are attempting to output the low byte of the internal address bus, by causing high current drivers having their inputs connected to the recreated Port 0 conductors to "force" the voltage levels in the recreated Port 0 register onto the 8031 Port 0 leads, causing the internal CPU to read these forced input leads. After State 5, the "forced" input levels are immediately removed to allow the internal Port 0 latches to reestablish the low byte of the address on the Port 0 leads. The ALE pulse is delayed enough to give the Port 0 leads enough time to recover before being latched as part of the external address bus.

BRIEF DESCRIPTION OF THE DRAWINGS

FIGS. 1A–1C are block diagrams of circuits used in generating EA, delayed ALE, and RESET signals applied to the 8031 microprocessor in FIG. 1.

DESCRIPTION OF THE INVENTION

Figure 1:
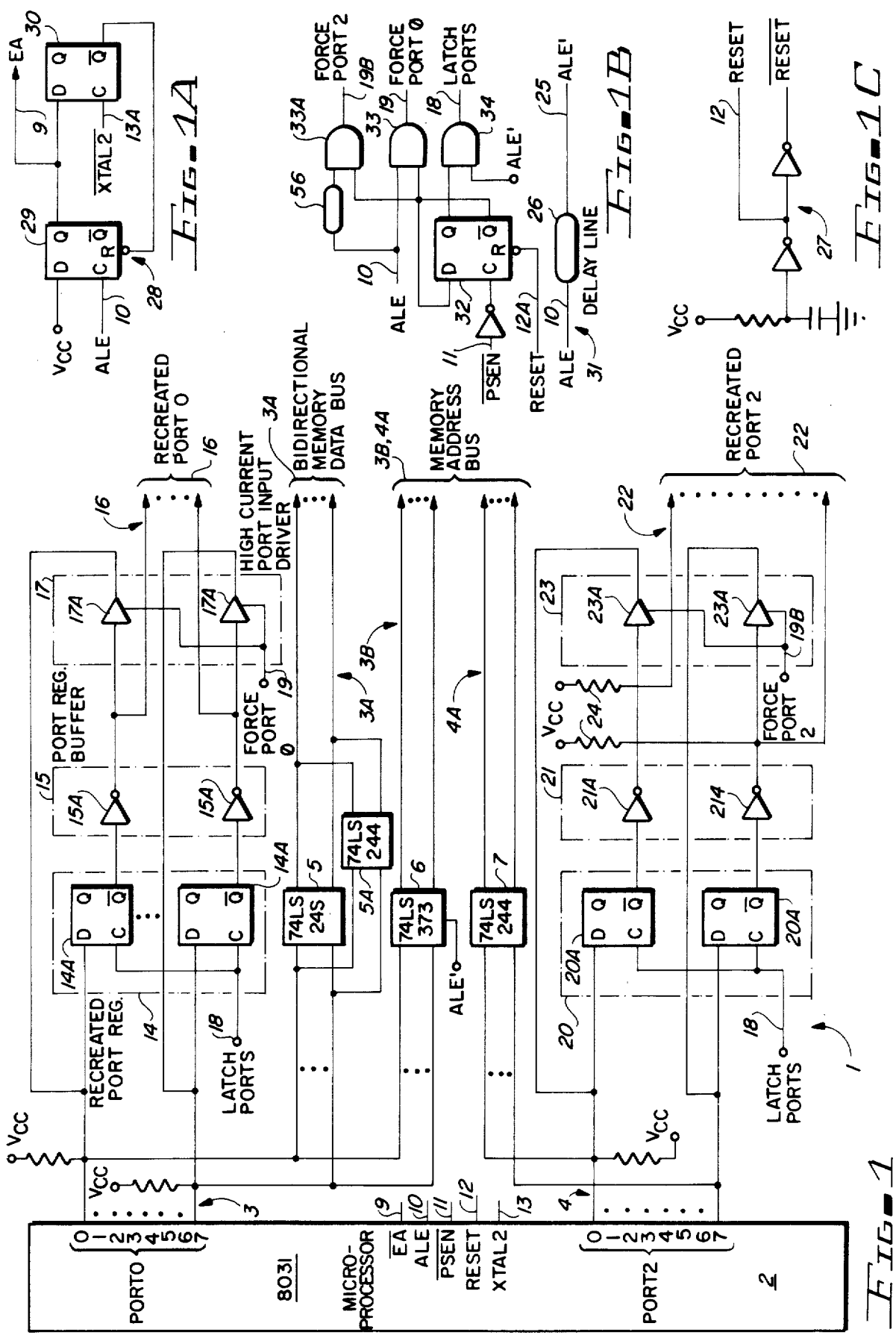
FIG. 1 is a block diagram of a portion of a emulator circuit which allows the Intel 8031 general purpose microprocessor to emulate an Intel 8051 single chip microcomputer.

Referring now to FIG. 1, reference numeral 1 designates a portion of the circuitry of a real time in-circuit emulator, which circuitry is fundamental to emulation of the Intel 8051 single chip microprocessor, operating in its "single chip mode", that is with its EA (external access) lead connected to $V_{CC}$. The circuitry 1 also is useful in emulating an 8031 general purpose microprocessor, i.e., with the EA lead connected to ground. Circuitry 1 includes an 8031 general purpose microprocessor. Those skilled in the art know that the 8031 integrated circuit and the 8051 integrated circuit actually consist of exactly the same integrated circuit chip, and that it is common to refer to that integrated circuit as an 8031 when EA is connected to ground, and as an 8051 when EA is connected to $V_{CC}$. The I/O ports 3 of microprocessor 2 are designated as Port 0. The I/O ports 4 are designated as Port 2. Each of the EA*, ALE, PSEN*, RESET and XTAL2 inputs are respectively designated by reference numerals 9, 10, 11, 12 and 13. (Asterisks are used herein to designate logical complements, as the bar normally used to designate logical complements is not available on the printer being used.)

The Port 0 leads of microprocessor 2 are internally multiplexed provide a common address/data bus. Consequently, each of the Port 0 leads 3 is connected to an input of a TTL transceiver 5 (which can be a 74LS245) and also to a latch circuit 6 (which can be a 74LS373). Each of the eight individual TTL transceivers in block also has a terminal connected to one conductor of a bidirectional memory data bus 3A, which, as subsequently explained, allows microprocessor 2 to function as an 8031.

A high current driver 5A is connected in parallel to transceiver 5 to help to drive Port 0 of the 8031 during an instruction fetch in order to override Port 0 drivers internal to the chip.

The TTL latches 6 each have an output connected to a respective conductor of a memory address bus 3B. The latches 6 are clocked by a delayed Address Latch Enable signal ALE' on conductor 25, as subsequently described.

Similarly, each of the Port 2 conductors 4 is connected to an input of a TTL driver circuit 7, which can be a 74LS244. The outputs of the driver 7 are connected to the conductors of memory address bus 4A. The entire memory address bus 3B, 4A functions as an ordinary external memory address bus when microprocessor 2 is in its microprocessor mode, i.e., when EA is at a low voltage level.

In accordance with the present invention, the Port 0 conductors 3 are each connected to a D-type flip flop 14A within a "recreated" port register 14. Each of the D-type flip flops 14A is clocked by a Latch Ports signal applied to conductor 18. The Q* output of each of the D-type flip flops 14A is connected to the input of a port register buffer circuit 15A within a port register buffer circuit 15. Each of the buffers 15A is an inverting buffer, the output of which is connected to a respective conductor of a recreated Port 0 bus 16. Each of the recreated Port 0 bus conductors 16 is connected to an input of a high current non-inverting "port input" driver 17A contained within block 17. Each of the high current port input drivers 17 is enabled by a Force Port 0 signal on conductor 19. The output of each of the high current "port input" drivers 17A is connected to a corresponding one of the Port 0 conductors 3.

Similarly, each of the Port 2 conductors 4 is connected to the D-input of a D flip flop 20A contained in a recreated port register 20. The Q* outputs of recreated port register 20 are connected to the inputs of inverting buffers 21A contained in block 21. The outputs of inverting buffers 21A are connected to corresponding conductors of recreated Port 2 bus 22. A pullup resistor 24 connects each of the recreated Port 2 conductors 22 to $V_{CC}$.

Note that the recreated Port 0 conductors 16 have no pullup resistors, so that the logic levels on recreated Port 0 conductors 16 can accurately replicate the 8051 internal Port 0 structure, which has no pullup resistors. The pullup resistors 24 of the recreated Port 2 are included in order to accurately replicate the internal Port 2 structure of the 8051, which does have internal pullup resistors.

The recreated Port 2 conductors 22 are connected to inputs of high current "port input" drivers 23A in block 23, the outputs of which are connected back to Port 2 lead conductors 4, as above. The clock inputs of D flip flops 20A are connected to the Latch Ports signal conductor 18. The enable inputs of high current port input drivers 23A are connected to the Force Port 2 signal on conductor 19B. The recreated port registers 14 and 20 can be 74LS175 integrated circuits. The port register buffers 15 and 21 can be 74LS01 integrated circuits. The high current port input drivers 17 and 23 can be 74S244 integrated circuits.

FIGS. 1A, 1B, and 1C show how the EA, Force Port 0, Force Port 2, Latch Ports, and ALE', Reset, and Reset* signals are produced. The EA signal on conductor 9 is generated in response to the ALE and XTAL2* signals applied by means of conductors 10 and 13A, respectively, to the clock inputs of a D flip-flop 29 and a D flip-flop 30. The ALE' signal is produced in response to ALE by means of a delay line 26. The Latch Ports signal on conductor 18 is produced by ANDing the ALE signal and the Q output of a D-type flip flop 32 that is clocked by PSEN*. Force Port 0 is produced (by means of AND gate 33) by logically ANDing ALE and the Q* output of D flip-flop 32. Force Port 2 is produced by logically ANDing (by means of AND gate 33A) a replica of ALE delayed by delaying line 56 and the Q* output of D flip-flop 32.

The Reset signal and Reset* signal are produced by circuit 27 when the $V_{CC}$ is applied.

Understanding of the operation of the circuit of FIG. 1 will perhaps be aided by a brief description of the internal architecture of the 8051/8031 single chip microcomputer. In FIG. 4A, reference numeral 2A designates the single chip microcomputer 2 when EA is "high", i.e., when the chip is in its "single chip mode", i.e., when it is internally configured as an 8051. Reference numeral 35 designates the internal CPU, which is connected by an 8 bit data bus 37 to an internal read only memory 38, internal port circuitry 39, 40, and other peripheral circuitry 57. Internal data bus 37 also is connected to internal random access memory 53. Internal address bus 36 is connected to internal ROM 38. With EA at a high level, internal data bus 37 and internal address bus 36 are inaccessible from the external leads of the circuit 2A.

Figure 4C:
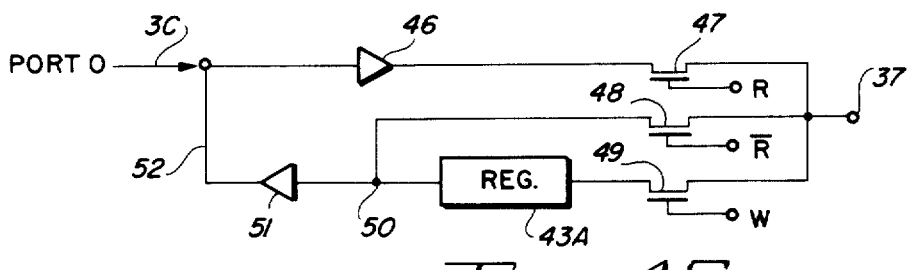
FIG. 4C is a diagram illustrating the detailed internal connections of the internal data bus to the Port 0 circuitry of an 8051 single chip microcomputer.
Figure 4A:
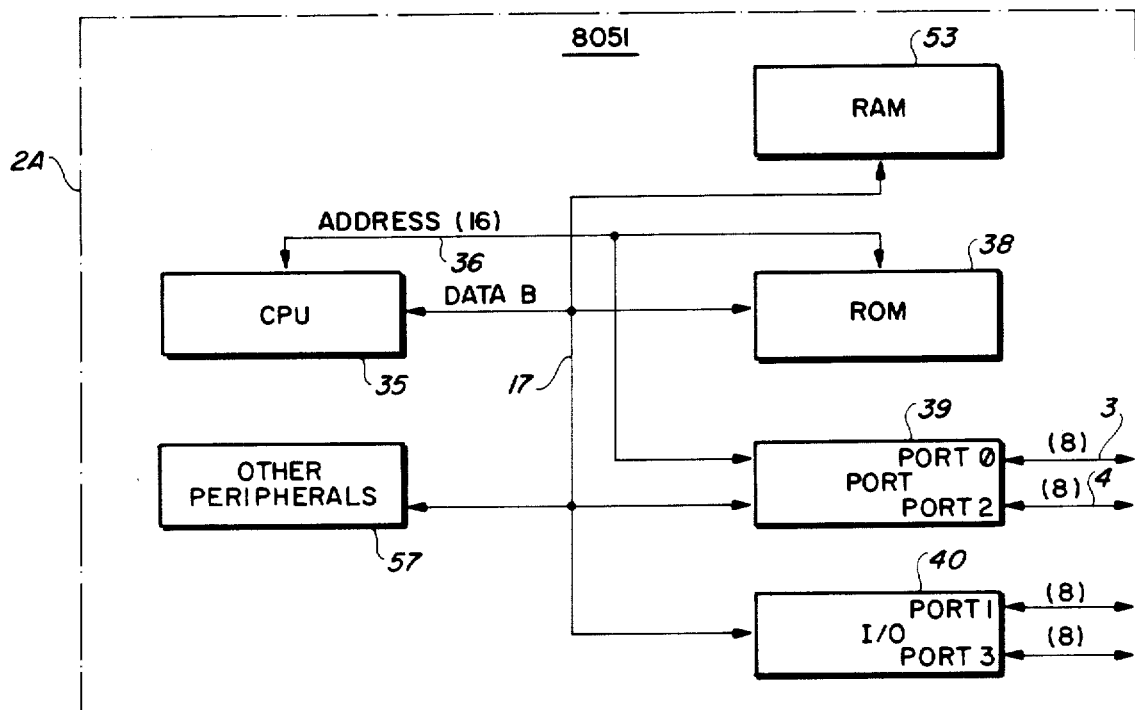
FIG. 4A is a block diagram illustrating the internal architecture of the 8051 single chip microcomputer.
Figure 4B:
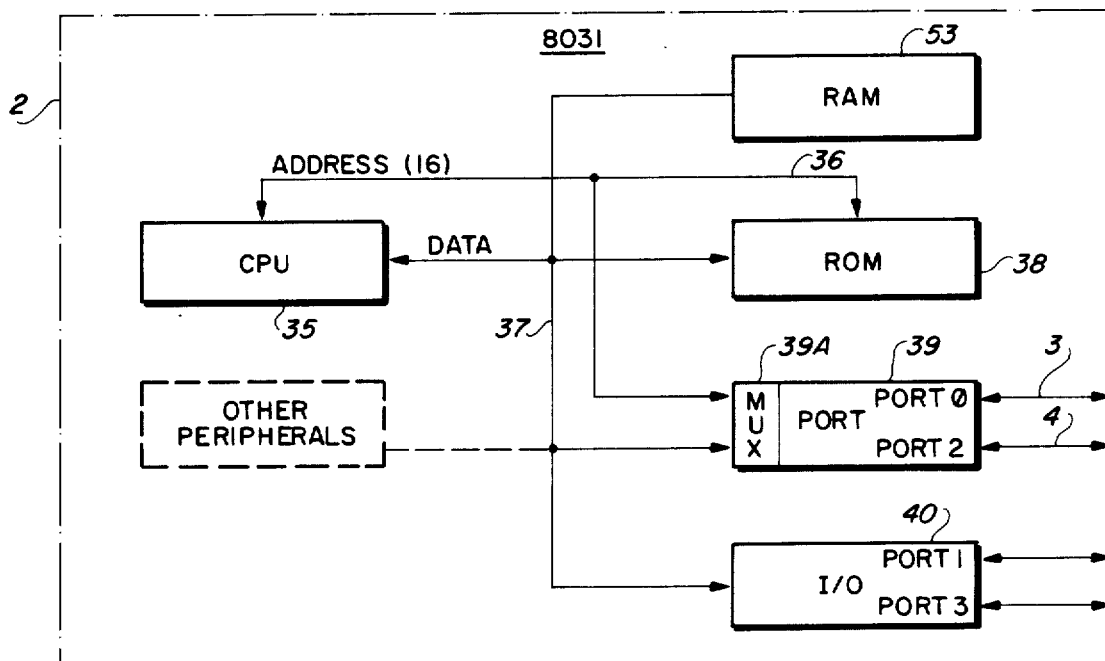
FIG. 4B is a diagram showing the internal architecture of the 8031 single chip general purpose microprocessor.

Referring now to FIG. 4B, exactly the same chip is shown, designated now by reference numeral 2 because the EA input is at a low voltage (instead of $+V_{CC}$), and hence is internally configured as an 8031. The internal circuitry therefore is configured so that the internal ROM is unused, and Port 0 is configured as a multiplexed 8 bit address/data bus, and Port 2 is configured as an external address bus. Internal address bus 36 and internal data bus 37 are both multiplexed by a multiplexer 39A to Port 0. Port 0 is connected to an external memory (not shown) which can include both RAM and ROM sections. Similarly, Port 2 is connected by conductors 4 to external memory or other addressable circuitry, which can easily selected by those skilled in the art to provide various functions.

In accordance with the present invention, the EA lead of microprocessor 2 is controlled in such a manner that for part of the external memory cycle, the 8031 is configured as an 8051 single chip microcomputer. The 8051 microcomputer retains the integrity of its internal Port 0 registers and its internal Port 2 registers, in contrast to the 8031 general purpose microprocessor, which destroys the contents of its internal Port 0 registers during state 4 phase 2 and state 1 phase 2 of every machine cycle. Thus, when EA is toggled to a high level, the 8031 designated by reference numeral 2 in FIG. 1 "thinks" it is an 8051 (the single chip microcomputer being emulated) and retains the logic levels of those port registers, which then can be output later on the Port 0 conductors 3 and Port 2 conductors 4. For the remaining portions of the external memory cycle, the 8031 designated by reference numeral 2 operates as a standard 8031 general purpose microprocessor, and is capable of outputting external memory addresses from its internal address bus 36 (FIGS. 4A and 4B) and writing data from its internal data bus 37 and reading external data and receiving it from Port 0 on its internal data bus 37.

The above mentioned re-creation of external Port 0 and external Port 2 requires that three conditions be met. First, the port register data stored in internal port registers for Port 0 and Port 2 must no be destroyed, as such data is needed for read-modify-write instructions. Second, new input data produced by external circuitry connected to recreated Port 0 conductor 16 of FIG. 1 must be sampled by the 8031 designated by reference numeral 2 in FIG. 1 at the same time that the 8051 single chip microcomputer being emulated reads data from its I/O ports. Finally, new output data that is generated in response to the internal data bus 37 and internal address bus 36 of the 8031 must be latched into and stored in the recreated port. If the foregoing conditions are met, the logical interface of the recreated Ports 0 and Port 2 are identical to that of the 8051 single chip microprocessor being emulated.

Figure 3:
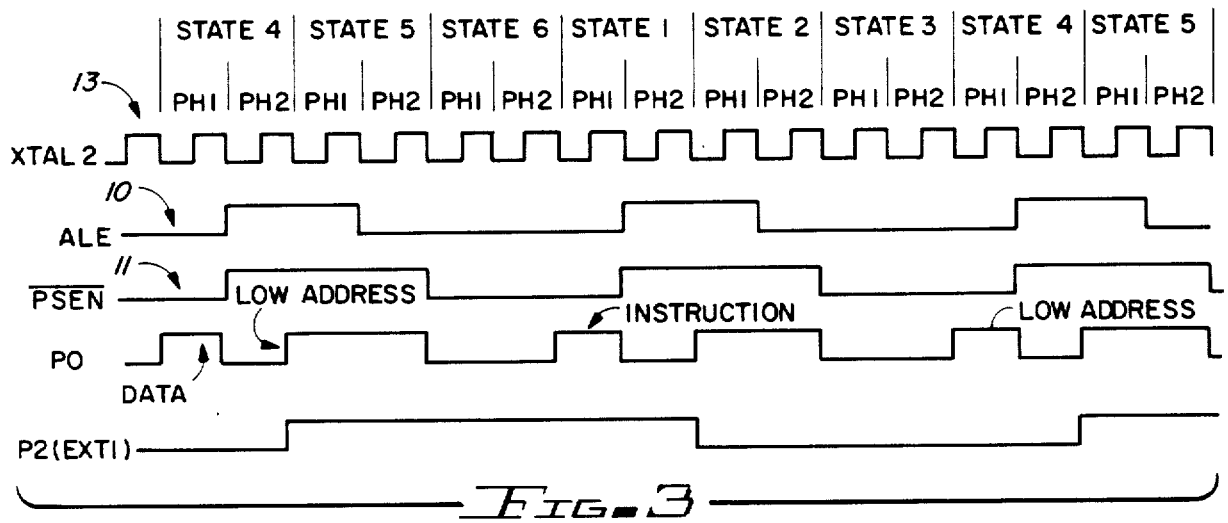
FIG. 3 is a timing diagram showing the standard 8031 machine cycle and memory cycle timing.

To understand how the above three conditions are met by the circuit shown in FIG. 1, the timing of the 8051/8031 must be understood. Referring first to FIG. 3, which shows an 8031 machine cycle broken into its six states, it should be noted that each of the six states has two phases, PH1 and PH2. State signals corresponding to each of these states drive internal sequential logic of the 8031. Each 8031 machine cycle can be broken into two external program memory fetch cycles, each of which begins with the low-to-high transition of the address latch enable signal ALE, which is designated by waveform 10 in FIG. 3. Waveform 13 designates the crystal oscillator output clock signal XTAL 2 on conductor 13 in FIG. 1.

During standard 8031 operation, Port 0 is a multiplexed external address/data bus, and Port 2 is an external address bus only. Addresses are produced on Port 0 by the 8031 during all of State 5 and all of State 2. Instructions and data are read from the Port 0 lead conductors 3 during Phase 1 of State 1, and during Phase 1 of State 4. Addresses on Port 2 conductors 4 are produced by the 8031 at the beginning of State 5, and at the beginning of State 2, and are held valid until the next Phase 2 of State 1 and Phase 2 of State 4, respectively.

However, during standard 8051 single chip microcomputer operation, Port 0 and Port 2 can function only as 8 bit I/O ports, and cannot be used as external address/data buses. When the internal CPU 35 (FIGS. 4A, 4B) reads from Port 0, the lead conductors 3 thereof are sampled during Phase 1 of State 5. When the internal CPU 35 reads from Port 2, the lead conductors 4 of Port 2 are sampled during Phase 2 of State 5. In writing to Port 0 and port 2, the levels on the port conductors 3 and 4 are updated during Phase 1 of State 1. In executing read-modify-write instructions, the 8051 single chip microcomputer reads its "source data" from the internal registers of Port 0 and Port 2, not from the lead conductors 3 and 4. This is accomplished by turning on field effect transistor 48 of FIG. 4C in order to read the source data from the port register 43A.

FIG. 4C illustrates the internal Port 0 structure of the 8051, wherein the internal data bus 37 is coupled by a field effect transistor 47, the gate of which is responsive to an internal read (R) command to connect data bus 37 to the output of an driver 46, the input of which is connected to a Port 0 conductor such as 3C. Each conductor of internal data bus 37 is also connected by means of a field effect transistor 48, the gate of which is responsive to the complement of the read signal (R*) to connect that data bus conductor to conductor 50, which is connected to an output of the internal Port 0 register 43A and to the input of an internal MOS driver circuit 51, which, when turned on, produces a suitable constant current via conductor 52 to the Port 0 conductor 3C. The input of each bit of the Port 0 register 43A is connected to a corresponding conductor of data bus 37 by field effect transistor 49, the gate electrode of which is responsive to a write signal.

Figure 2:
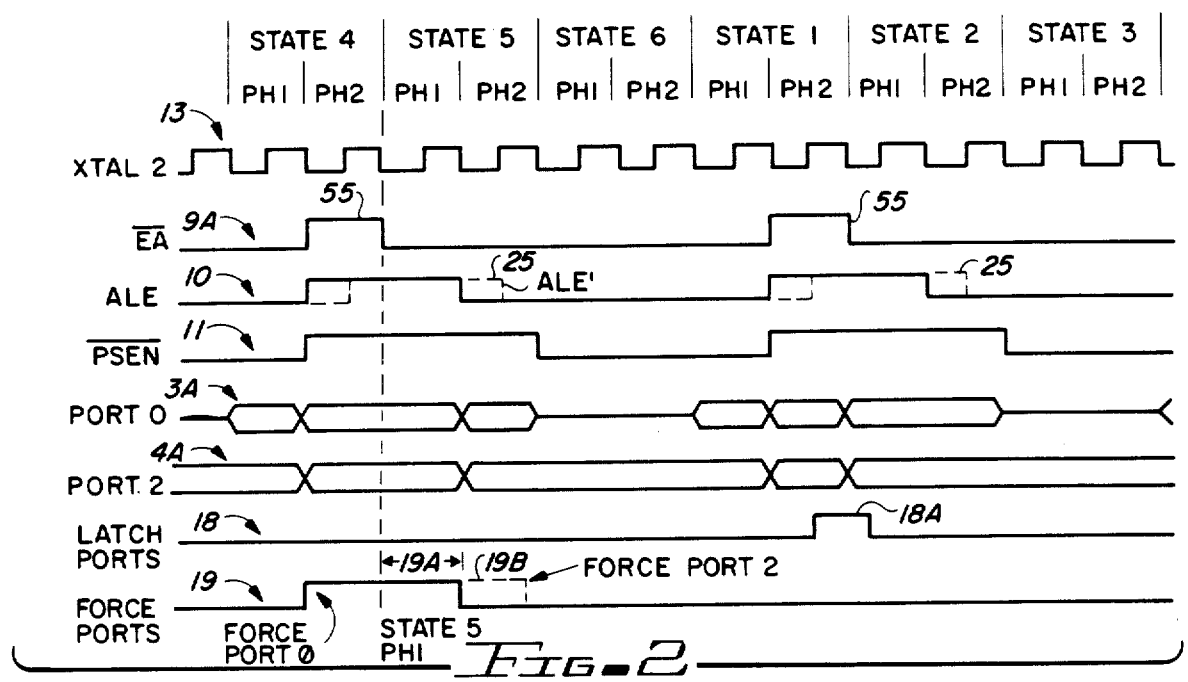
FIG. 2 is a timing diagram useful in explaining the operation of the circuit of FIG. 1.

With this background in mind, the timing diagram of FIG. 2 will be referred to to show how the external ports corresponding to Port 0 and Port 2 are recreated. First, the EA* (External Access) signal is raised to a high level during Phase 2 of every ALE pulse, i.e., during Phase 2 of State 4 and Phase 2 of State 1. The EA* pulses designated by reference numerals 55 in FIG. 2 cause the 8031 microprocessor switch to its "single chip microcomputer mode", and consequently it "thinks" it is an 8051 during Phase 2 of State 4 and Phase 2 of State 1, and thereby avoids destroying the contents of its internal Port 0 register. Recall that normally the 8031 writes "1's" in its internal Port 0 registers before the negative transition of the ALE pulse of each machine cycle. During the EA* pulses 55, the contents of the Port 0 internal register (See register 43A of FIG. 4C) and the internal Port 2 register are output to the Port 0 lead conductors 3 and Port 2 lead conductors 4, respectively. Then, at the end of phase 2 of state 1, the Latch Ports signal 18 in FIG. 2 produces a pulse 18A, the trailing edge of which latches levels on the Port 0 lead conductors 3 into the recreated Port 0 register 14, and also latches the levels on the Port 2 lead conductors 4 into the recreated Port 2 register 20, and thereby "captures" the contents of the internal Port 0 and internal port 2 registers. This occurs immediately after the internal port registers have been updated. This means that a register is updated immediately so it is possible to write to a register and read it back in the next instruction cycle. Consequently, the externally latched recreated port registers 14 and 20 contain the most recent values of the internal Port 0 register and internal Port 2 register, respectively.

During State 5, the external inputs to Port 0, i.e., the wired OR of the output of the port register buffers 15 and the outputs produced by external circuitry connected to the recreated Port 0 conductors 16, are forced back into Port 0 by "enabling" the high current "port input" driver 17A during the portion of the Force Ports waveform 19 designated by arrow 19A. During this time, and in accordance with the standard operation of the 8051, the levels on the port lead conductors 3 and 4 are read or sampled by the internal CPU 35. The high current port drivers 17 and 23 "overpower" the internal Port 0 driver and the internal Port 2 driver, each of which are attempting to output address levels. Consequently, the reading by the internal CPU 35 of the levels on the Port 0 conductors 3 samples the actual values "forced" from the recreated Port 0 conductors 16 onto Port 0 lead conductors 3. This, in effect, causes the internal data bus 37 to receive the data on recreated port conductors 16, i.e., causes the internal CPU 35 to read the recreated Port 0 conductors 16, even though the 8031 single chip microcomputer is not capable of reading Port 0 as an I/O port.

After state 5, Phase 1 elapses, the forced inputs produced by the Force Port 0 signal on conductor 19 and waveform 19 of FIG. 2 are removed, allowing the internal Port 0 register to reestablish the unforced levels on Port 0 lead conductors 3. In order to accomplish this, the ALE pulse is delayed slightly by a delay line 26 (FIG. 1B) to latch low address into the latches in block 6 of FIG. 1 so that the low address value is available on the external memory address bus conductors 3B.

During State 5, the external inputs to Port 2 are forced on Port 2 lead conductors 4 in response to the Force Port 2 pulse 19B. Upon removing the Force Port 2 signal, the high byte of the internal address register of Port 2 will again reappear on the Port 2 lead conductors 4, and normal microprocessor mode operation can continue, wherein the microprocessor 2 can continue to output both addresses and data and can read data from the external address and data buses, respectively.

Thus, it can be seen that the above described embodiment of the invention enables an 8051 single chip microcomputer to be emulated without the need for a bond out chip.

While the invention has been described with reference to a particular embodiment thereof, those skilled in the art will be able to make various modifications to the described embodiment of the invention without departing from the true spirit and scope thereof. For example, it is intended that embodiments of the invention wherein individual elements or steps are equivalent to those in the described embodiments in that they perform substantially the same function in substantially the same way to accomplish substantially the same result are equivalent to the embodiments described and claimed herein. For example, Intel produces an entire "family" of single chip microcomputers, including the 8052 and the 8044 which, when their respective EA pulses are at a low level, operate as general purpose microprocessors. The general principles described in the above embodiment of the invention apply also to other members of the 8051 family of single chip microcomputers, making it possible to emulate them without bond out chips. As a general matter, the basic concepts of the present invention are applicable to any microcomputer that has the property that it can be operated in response to an external access control signal so as to make its internal address and/or data buses externally accessible and thereby provide a means for determining the data and address transfers to internal circuitry, which can be "recreated" externally of the microcomputer. Various other microcomputers, which, in response to an external access input or the like, can operate in a first mode with various internal "features" or functions, for example a memory cache, or a memory controller, which are operative, and can respond to a second state of the control input to operate in a second mode wherein the internal features or functions are inoperative, and wherein such internal features or functions are externally recreated and operated in conjunction with another like microcomputer which is operated with a control input in the first state, with I/O ports connected to the recreated features or functions, and is operated in the first mode for a portion of a time and in the second mode for another portion of the time to emulate the microcomputer and provide external access to the states of the internal features or functions of the microcomputer being emulated, is deemed to be within the scope of the present invention. It should be noted that the Forced Ports function is used whenever the ports must perform two entirely different functions, including functioning as input-output ports for part of a memory cycle, and as data buses and/or address buses during another portion of an internal memory cycle. During the portion of an internal memory cycle in which the microcomputer is functioning as a microcomputer with internal address and data buses inaccessible, the I/O ports function as such when the same ports are being used as address buses and memory buses, the Forced Ports function is essential to effectuate inputting of information produced by the recreated external features or functions back into the microcomputer so that its internal CPU can operate on this information in the same fashion that the microcomputer being emulated operates on the same data that would be produced by the internal features or functions in the microcomputer being emulated.

We claim:

1. A method of using a first single chip microcomputer that operates in a single chip mode wherein a control input is at a first logic level and causes an internal address bus and an internal data bus to be inaccessible from outside of the first single chip microcomputer, the first single chip microcomputer operating in a microprocessor mode wherein the control input is at a second logic level and causes the internal data bus and the internal address bus to be coupled to an external bus for outputting address and reading and writing data in order to emulate a second single chip microcomputer operating in its single chip mode, the method comprising the steps of:

(a) providing an external register having a plurality of outputs, and a plurality of corresponding inputs connected, respectively, to a plurality of leads of a port of the first single chip microcomputer, and connecting corresponding outputs of the external register to a plurality of recreated external port conductors;

(b) coupling the leads of the port to a plurality of external data bus conductors;

(c) applying the second logic level to the control input;

(d) operating the first single chip microcomputer to write a byte from its internal data bus into an internal latch of the port;

(e) outputting the byte from the internal latch via the leads of the port to the inputs of the external register;

(f) latching the byte into the external register;

(g) applying the first logic level to the control input during a portion of a machine cycle of the first single chip microcomputer wherein an internal CPU thereof would destroy information in an internal register;

(h) logically ORing a plurality of logic levels occurring on the outputs of the external register with logic levels produced on outputs of an external circuit connected to the recreated external port conductors; and (i) forcing levels on the recreated external port conductors onto the leads of the port, respectively, while the internal CPU of the first single chip microcomputer reads the levels of the leads of the port.

2. The method of claim 1 wherein step (i) includes overpowering an internal port register output driver to cause it to sink sufficient currents supplied from external driver circuitry to a plurality of respective leads of the port so that predetermined voltages are produced on the respective leads of the port while the internal CPU is reading a plurality of logic levels of the leads of the port.

3. The method of claim 2 including applying voltage levels representative of a logical OR of contents of the external register and the outputs of the external circuit to input of the external driver circuitry.

4. The method of claim 3 wherein step (b) includes coupling the leads of the port to the external data bus conductors by means of a plurality of transceiver circuits.

5. The method of claim 4 including also coupling the leads of the port to a plurality of inputs of a plurality of external latch circuits, respectively, and coupling a plurality of external address bus conductors to a plurality of outputs of those external latch circuits, respectively.

6. The method of claim 1 including operating the first single chip microcomputer to output data to a plurality of external data bus conductors via the leads of the port and read data from the external data bus conductors via the leads of the port while the second logic level is applied to the control input.

7. A method of using a first microcomputer that operates in a first mode wherein a control input is at a first logic level that causes an internal data bus and an internal address bus to be not externally accessible and also causes an internal circuit to operate, the first microcomputer also operating in a second mode wherein the control input is at a second logic level that causes the internal data bus and the internal address bus to be externally accessible and also causes the internal circuit to be inoperative, in order to emulate a second microcomputer operating in its first mode, the method comprising the steps of:
 (a) providing an external circuit that is essentially similar to the internal circuit and has terminals corresponding to terminals coupling the internal circuit to the internal data bus of the first microcomputer, and coupling the terminals of the external circuit to a plurality of leads to an input/output port of the first microcomputer;
 (b) writing first information from an internal CPU of the first microcomputer into an internal register of the input/output port and transferring the first information from that internal register via the leads of the input/output port into the external circuit, and causing the external circuit to perform a function on the first information that is essentially the same as a function performed on the first information by the internal circuit of the second microcomputer being emulated;
 (c) forcing second information, which results from operation by the external circuit on the first information, onto a plurality of leads of the input/output port while the internal CPU of the first microcomputer is reading levels of the leads of the input/output port; and
 (d) operating the first microcomputer to effectuate writing data to and reading from an external data bus via the leads of the input/output port while the second logic level is applied to the control input.

8. The method of claim 7 including operating the first microcomputer to effectuate outputting of addresses via the leads of the input/output port to an external address bus.

9. In an apparatus for using a first microcomputer to emulate a second microcomputer, wherein the first microcomputer operates in a first mode in which a control input is at a first logic level that causes an internal data bus and an internal address bus to be not externally accessible and also causes an internal circuit to operate, and wherein the first microcomputer also operates in a second mode in which the control input is at a second logic level that causes the internal data bus and the internal address bus to be externally accessible and also causes the internal circuit to be inoperative, the improvement comprising:
 (a) external circuit means for performing a function that is substantially the same as a function performed by the internal circuit, the external circuit means including a group of terminals coupled to a plurality of leads of an input/output port of the first microcomputer, the group of terminals of the external circuit means corresponding to a group of terminals of the internal circuit coupled to the internal data bus;
 (b) means for writing first information from an internal CPU in the first microcomputer into an internal register of the input/output port, and means for transferring the first information from that internal register via the leads of the input/output port into the external circuit means and causing the external circuit means to perform a function on the first information that is substantially the same as a function performed on the first information by the internal circuit of the second microcomputer being emulated, in order to produce second information;
 (c) means for forcing the second information onto the leads of the input/output port while the internal CPU of the first microcomputer is reading levels of the leads of the input/output port; and
 (d) means for operating the first microcomputer to effectuate writing data to and reading data from an external data bus via the leads of the input/output port while the second logic level is applied to the control input.

10. In the apparatus of claim 9, the improvement further comprising means for operating the first microcomputer to effectuate outputting of addresses via the leads of the input/output port to an external address bus.

11. In an apparatus for using a first single chip microcomputer to emulate a second single chip microcomputer operating in its single chip mode, wherein the first single chip microcomputer operates in a single chip mode in which a control input is at a first logic level and causes an internal address bus and an internal data bus to be in accessible from outside of the first single chip microcomputer, the first single chip microcomputer also operating in a microprocessor mode when the control input is at a second logic level and causes the internal data bus and the internal address bus to be coupled to an external bus for outputting addresses and reading and writing data, the improvement comprising:
 (a) an external register having a plurality of outputs, and a plurality of corresponding inputs connected, respectively, to a plurality of leads of a port of the first single chip microcomputer, the port having internal latch circuitry;
 (b) means for connecting a plurality of corresponding outputs of the external register to a plurality of recreated external port conductors, respectively;
 (c) means for coupling the leads of the port to a plurality of external data bus conductors;
 (d) means for applying the second logic level to the control input;
 (e) means for operating the first single chip microcomputer to write a byte from its internal data bus into the internal latch circuitry of the port;
 (f) means for outputting the byte from the internal latch circuitry via the leads of the port to the inputs of the external register;
 (g) means for latching the byte into the external register;
 (h) means for applying the first logical level to the control input during a portion of a machine cycle of the first single chip microcomputer wherein an internal CPU of the first single chip microcomputer would destroy information in an internal register;
 (i) means for logically ORing logical levels occurring on the outputs of the external register with logic levels produced on outputs of an external circuit connected to the recreated external port conductors; and
 (j) means for forcing levels on the recreated external port conductors onto the leads of the port, respectively, while the internal CPU of the first single chip microcomputer read the levels of the leads of the port.

12. The improvement of claim 11 wherein the forcing means includes external driver circuit means for forcing sufficient currents into a plurality of respective leads of the port that predetermined voltages are produced on the respective leads of the port while the internal CPU reads logic levels of the leads of the port.

13. The improvement of claim 12 including means for applying voltage levels representative of a logical OR of contents of the external register and the outputs of the external circuit to inputs of the driver circuit means.

14. The improvement of claim 13 wherein the coupling means couples the leads of the port to the external data bus conductors, respectively, by means of a plurality of transceiver circuits.

15. The improvement of claim 14 including a plurality of external latch circuits having inputs coupled to the leads of the port and having outputs coupled to a plurality of external address bus conductors.

16. The improvement of claim 15 wherein the first single chip microcomputer is an Intel 8051, and the control input is an external access input thereof.

17. The improvement of claim 11 including means for operating the first single chip microcomputer to output data to the external data bus conductors via the leads of the port and rad data from the external data bus conductors via the leads of the port while the second logical level is applied to the control input.

18. In an apparatus for using a first microcomputer to emulate a second microcomputer, wherein the first microcomputer operates in a first mode in which a control input is at a first logic level that causes an internal circuit to operate, and wherein the first microcomputer also operates in a second mode in which the control input is at a second logic level that causes the internal circuit to be inoperative, the improvement comprising:
(a) external circuit means for performing a function that is substantially the same as a function performed by the internal circuit, the external circuit means including a group of terminals coupled to the first microcomputer, the group of terminals of the external circuit means corresponding to a group of terminals of the internal circuit coupled to an internal CPU of the first microcomputer;
(b) means for writing first information, which is the same as information to be written from the internal CPU of the second microcomputer being emulated, from the internal CPU of the first microcomputer onto a plurality of external conductors connected between the first microcomputer and the external circuit means and causing the external circuit means to perform a function on the first information that is substantially the same as a function performed on the first information by the internal circuit of the second microcomputer being emulated, in order to produce second information; and
(c) means for effectuating transfer of the second information back into the internal CPU of the first microcomputer.

19. In an apparatus for using a first microcomputer to emulate a second microcomputer, wherein the first microcomputer operates in a first mode in which a control input is at a first logic level that causes an internal circuit to operate, and wherein the first microcomputer also operates in a second mode in which the control input is at a second logic level that causes the internal circuit to be inoperative, the improvement comprising:
(a) circuit means for performing a function that is substantially the same as a function performed by the internal circuit, the circuit means including a group of terminals coupled to the terminals of the first microcomputer, the group of terminals of the circuit means corresponding to a group of terminals of the internal circuit coupled to an internal CPU of the first microcomputer;
(b) means for writing first information, which is the same as information to be written from the internal CPU of the second microcomputer being emulated, from the internal CPU of the first microcomputer onto a plurality of conductors connected between the first microcomputer and the circuit means and causing the circuit means to perform a function on the first information that is substantially the same as a function performed on the first information by the internal circuit of the second microcomputer being emulated, in order to produce second information; and
(c) means for effectuating transfer of the second information back into the internal CPU of the first microcomputer.

20. A method of using a first single chip microcomputer that operates in a single chip wherein a control input is at a first logic level and causes an internal address bus and an internal data bus to be inaccessible from outside of the first single chip microcomputer, the first single chip microcomputer being an INTEL 8051 and operating in a microcomputer mode wherein the control input is at a second logic level and causes the internal data bus and the internal address bus to be coupled to an external bus for outputting addresses and reading and writing data in order to emulate a second single chip microcomputer operating in its single chip mode, the method comprising the steps of:
(a) providing an external register having a plurality of outputs, and a plurality of corresponding inputs connected, respectively, to a plurality of leads of a port of the first single chip microcomputer, and connecting corresponding outputs of the external register to a plurality of recreated external port conductors;
(b) coupling the leads of the port to a plurality of external data bus conductors by means of a plurality of transceiver circuits;
(c) applying the second logic level to the control input;
(d) operating the first single chip microcomputer to write a byte from its internal data bus into an internal latch of the port;
(e) outputting the byte from the internal latch via the leads of the port to the inputs of the external register;
(f) latching the byte into the external register;
(g) applying first logic level to the control input during a portion of a machine cycle of the first single chip microcomputer wherein an internal CPU thereof would destroy information in an internal register;
(h) logically ORing a plurality of logic levels occurring on the outputs of the external register with logic levels produced on outputs of an external circuit connected to the recreated external port conductors;
(i) forcing levels on the recreated external port conductors onto the leads of the port, respectively, while the internal CPU of the first single chip microcomputer read the levels of the leads of the port by overpowering an internal port register output driver to cause it to sink sufficient currents supplied from external driver circuitry to a plurality of respective leads of the port so that predetermined voltages are produced on the respective leads of the port while the internal CPU is reading a plurality of logic levels of the leads of the port;

(j) applying voltage levels representative of a logical OR function of contents of the external register and the outputs of the external circuit to inputs of the external driver circuitry; and (k) coupling the leads of the port to a plurality of inputs of a plurality of external latch circuits, respectively, and coupling a plurality of external address bus conductors to a plurality of outputs of those external latch circuits, respectively.

* * * * *